United States Patent [19]
Bodell

[11] Patent Number: 6,059,429
[45] Date of Patent: May 9, 2000

[54] ROTATION LIMITING ARRANGEMENT FOR A LAMPHEAD SWIVEL UNIT

[75] Inventor: Steven W. Bodell, Troutville, Va.

[73] Assignee: Hubbell Incorporated, Orange, Conn.

[21] Appl. No.: 09/087,595

[22] Filed: May 29, 1998

[51] Int. Cl.[7] ................................................ F21V 21/28
[52] U.S. Cl. ...................... 362/287; 362/269; 362/427
[58] Field of Search ................................ 362/269, 287, 362/371, 427

[56] References Cited

U.S. PATENT DOCUMENTS 4,381,538  4/1983  Warshawsky ........................... 362/269
4,880,193  11/1989  Warshawsky ............................ 248/122

*Primary Examiner*—Cassandra Spyrou
*Assistant Examiner*—Leo Boutsikaris
*Attorney, Agent, or Firm*—Jerry M. Presson; Leopold Presser

[57] ABSTRACT

An arrangement for limiting the rotational movement or displacement of a swivel unit mounting a lamphead. More particularly, disclosed is a rotation limiting arrangement including cooperating stop elements for controlling the rotational displacement of a lamphead employed in an exit sign or the like within predetermined angularly defined boundaries, so as to thereby prevent the lamphead from at least partially obscuring the legend of the exit sign.

6 Claims, 4 Drawing Sheets

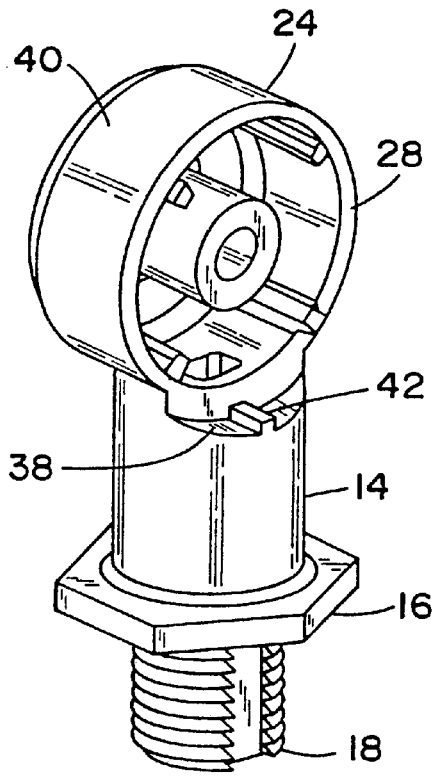
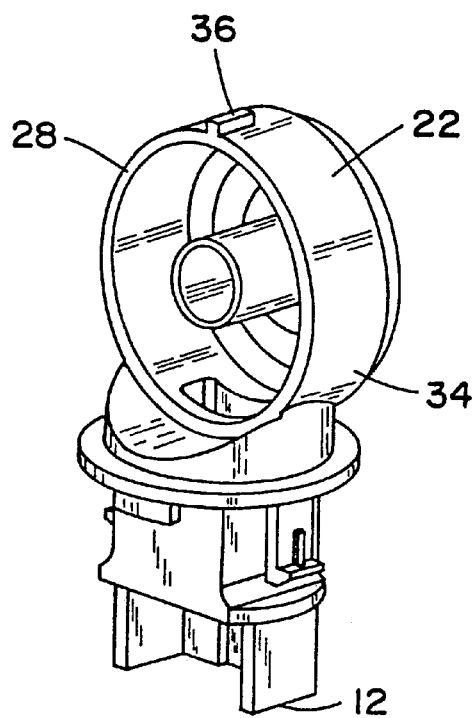
FIG. 5    FIG. 6
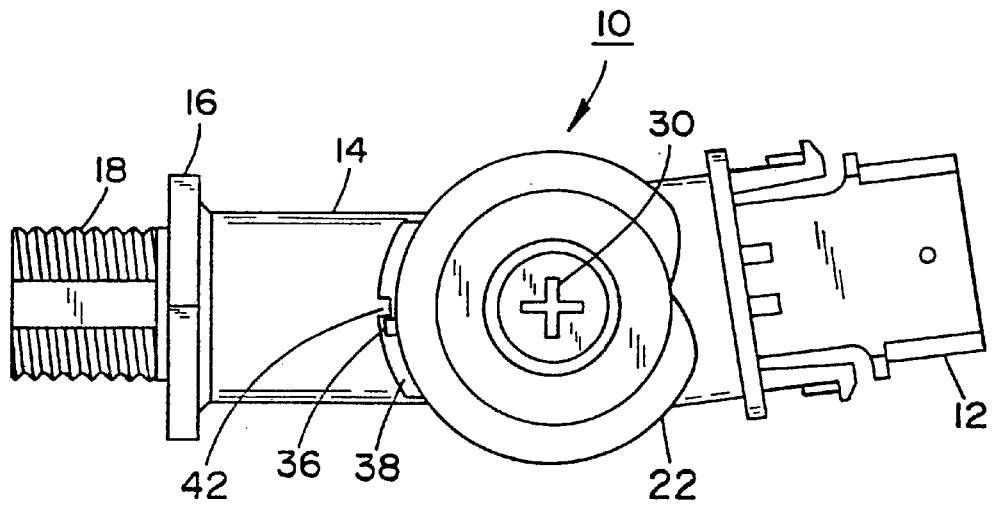
FIG. 7

ROTATION LIMITING ARRANGEMENT FOR A LAMPHEAD SWIVEL UNIT

BACKGROUND OF THE INVENTION

1. Field of the Invention

The present invention relates to an arrangement for limiting the rotational movement or displacement of a swivel unit mounting a lamphead. More particularly, the invention is directed to a rotation limiting arrangement for controlling the rotational displacement of a lamphead employed in an exit sign or the like within predetermined angularly defined boundaries, so as to thereby prevent the lamphead from at least partially obscuring the legend of the exit sign.

2. Discussion of the Prior Art

Currently, in both industry and commerce, among other applications, lampheads are frequently arranged on combination exit signs and similar products in order to provide illumination for specific legends which are represented by the exit sign. In view of a recent Underwriters Laboratory (UL) interpretation of the newly promulgated 1998 NFPA code, lampheads are not allowed to rotate downwardly relative to their mounting on an exit sign so as to either fully or partially, cover or obscure the exit legend. Consequently, in order to prevent any potential rotational movement of the lamphead from blocking or obscuring from view the exit sign legend, it has been considered necessary to consider developing an arrangement or device which prevents a lamphead from rotating or pivoting downwardly beyond a specific rotational limit.

In essence, a lamphead of the type described herein is supported on a swivel unit consisting of two mutually rotatable mating swivel halves which are normally held together in face-to-face contact by means of an interconnecting screw member so as to be maintained in rotationally fixed positions relative to each other. Ordinarily, one of the swivel halves mounts the lamphead whereas the other swivel half which mates therewith normally includes a radially extending post portion of hollow-cylindrical cross-section, which may have a hexagonal nut fixed thereto at a distal end, and from which a screwthreaded stub shaft extends in a coaxial arrangement so as to be able to be mounted on a suitable fixture or panel, as may be required by the particular utilization of the lamphead device. The swivel unit half which mounts the lamphead is adapted to pivot relative to the swivel unit half mounting hollow post and stub shaft to a considerable rotational. This aspect, at times, may lead to the lamphead being inadvertently rotated downwardly so as to either fully or partially cover or obscure the exit legend of the exit sign.

SUMMARY OF THE INVENTION

In order to restrict the extent of any relative rotational displacement or pivoting motion between the mating halves of the swivel unit, so as to essentially provide a limit to the extent rotational movement between the swivel unit halves mounting, respectively, the lamphead and the post with the stub shaft, pursuant to the present invention provision is made to equip the swivel unit halves with tabs or stop elements adapted to engage each other at a specific rotational orientation between the halves of the swivel unit. This will preclude the excessive swiveling movement of the lamphead tending to cover or obscure the exit legend or the like which is present on the exit sign.

In this connection, the swivel unit halves are each cylindrical in shape and of equal outer diameters, with planar mating surfaces being in rotationally slidable contact with each other when assembled. The external cylindrical surface of the swivel unit half preferably mounting the equipped with a radially outwardly extending tab or stop member. A curvilinear groove is formed in the post of the mating swivel unit half so as to extend along the outer cylindrical surface of the swivel unit half, and axially overlaps the mating surfaces so as to be in the plane of the radially outwardly extending tab of the other swivel unit half. The groove which is formed in the cylindrical post includes an upstanding tab or stop element located generally centrally along the length of the groove which, upon the swivel half mounting the lamphead being rotated through a predetermined angular displacement relative to the post and stub shaft, will come into surface contact with the tab or stop element on the mating swivel half, and prevent any further rotational pivoting of the lamphead relative to the post and stub shaft.

Pursuant to a further aspect of the invention, the mating cylindrical halves of the swivel unit may be disengaged and rotationally positioned relative to each other whereby the projecting tab which is located for example, on the swivel unit half mounting the lamphead is positioned on the opposite side of the tab which is formed in the curvilinear groove of the cylindrical post extending from the other swivel half, so as to facilitate the limited pivoting movement of the lamphead in the opposite direction relative thereto; in effect, forming a left-handed lamphead swivel arrangement.

Pursuant to a modified construction of the invention, rather than the cooperating tabs or stop elements being formed, respectively, on the outer cylindrical diameter of the swivel unit half mounting the lamphead, and in the curvilinear groove formed in the post with the stub shaft, the cooperating tabs or rotation limiting stop elements can be formed on internal annular surfaces of the swivel unit halves, wherein the tabs cooperate in essentially same manner as the tabs or stops formed at the exterior of the swivel unit. In that instance, however, the tabs or stop elements are not exposed to the exterior, in effect, they are essentially hidden from view, although their rotation limiting function is basically analogous to that of the cooperating tabs or stop elements located exteriorly on the swivel unit.

Accordingly, is an object of the present invention to provide an arrangement for limiting the rotational displacement of a lamphead.

It is another object of the present invention to provide an arrangement for limiting the rotational displacement of a lamphead utilized for illuminating legends on an exit sign, which is mounted on a swivel unit, and wherein the arrangement for limiting the rotational displacement of the lamphead are integral constituents of the swivel unit.

Yet another object of the present invention is to provide an arrangement for imparting limits to the extent of a rotational movement of a lamphead which is mounted on a swivel unit, wherein the rotation limiting arrangement comprises cooperating tabs or stop elements.

A further object of the present invention resides in the provision of an arrangement for limiting the rotational movement of mutually rotatable swivel halves of a swivel unit mounting, respectively, a lamphead and post and stub shaft structure, wherein rotation limiting means for the lamphead are integrally formed with the swivel unit.

A still further object of the present invention resides in the provision of a swivel unit mounting a lamphead and consisting of mating mutually rotatable swivel halves incorporating internal tab elements adapted to functionally cooperate for limiting the rotational displacement of the lamphead and of the swivel halves relative to each other.

BRIEF DESCRIPTION OF THE DRAWINGS

Reference may now had be to the following detailed description of preferred embodiments of the invention, taken in conjunction with the accompanying drawings; in which:

FIG. 1 illustrates a perspective view of a swivel unit mounting a lamphead shown in a first pivoted position of the lamphead relative to a post and stub shaft arrangement for mounting the arrangement on a fixture, exit sign or the like;

FIGS. 5 and 6 illustrate perspective views of the swivel halves mounting, respectively, the lamphead and the post and stub shaft arrangement shown the cooperating tab or stop element structures;

FIG. 7 illustrates the contacting position of the cooperating tab elements in the rotationally extended orientation of the lamphead relative to the post and stub shaft arrangement as represented in FIG. 2;

DETAILED DESCRIPTION OF PREFERRED EMBODIMENTS

Figure 1:
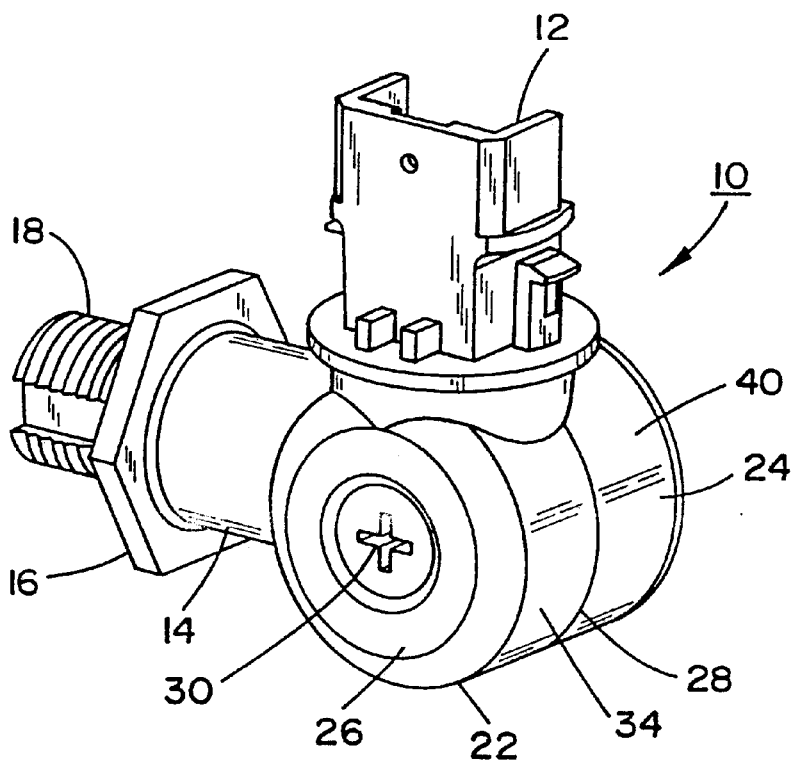
Figure 2:
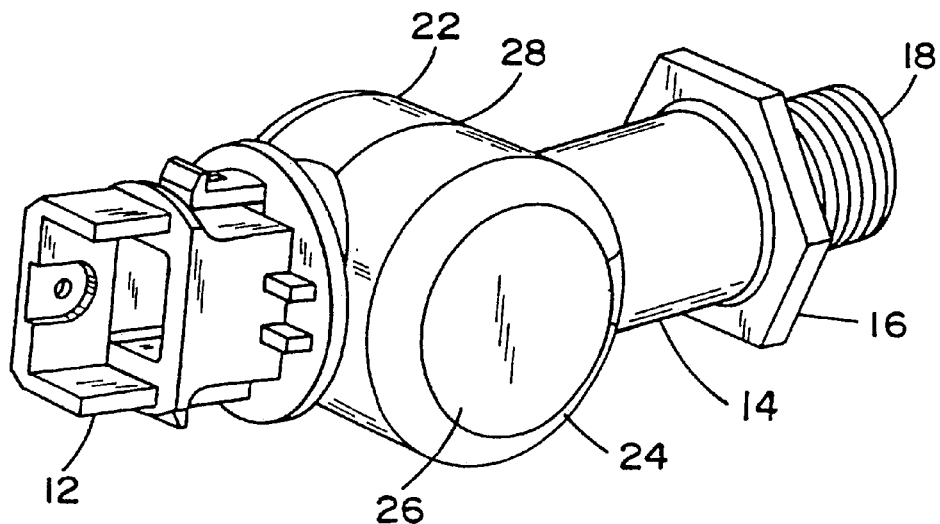
FIG. 2 illustrates a view similar to FIG. 1, showing an opposite side of the lamphead in the fully extended position relative to the post and stub shaft arrangement.

Referring now specifically to the drawings, and particularly to FIGS. 1 and 2, in FIG. 1 there is illustrated a swivel unit assembly 10 mounting a lamphead 12, and a hollow-cylindrical post 14 terminating in a hexagonal nut 16 and a screwthreaded stub shaft 18 coaxially extending from the post 14 for attaching the lamphead 12 in or on a suitable support or fixture, such as an exit sign, as is well known in industry. In particular, a swivel unit of that type mounting a lamphead is frequently employed for the illumination of exit signs, wherein electrical wiring or conductors (not shown) normally extend through the generally hollow stub shaft and hollow-cylindrical post, and through the swivel unit into the lamphead.

As illustrated in FIG. 1, in that particular instance, the lamphead 12 is oriented into a swiveled position so as to extend at an approximately 90° angle relative to the axial extent of the hollow-cylindrical post 14 and stub shaft 18, in effect, the axis of the lamphead 12 subtends the narrowest or acutest angle relative to the longitudinal axis of the post 14 and stub shaft 18. In order to provide for rotational or angular adjustment between the lamphead and the hollow-cylindrical post and stub shaft, the swivel unit 10 is essentially constituted of two swivel halves 22, 24 consistency of hollow cylindrical elements with outer end surfaces 26, and mutually rotatably displaceable sliding contact surfaces 28 at their plane of juncture. The swivel halves 22, 24 are adapted to be retained together and restrained from relative rotation by means of a screw 30, as shown in FIG. 1 of the drawings, which extends through the center axis of the swivel unit. The loosening of the screw enables the two halves 22, 24 of the swivel unit 10 to rotate and to be rotationally displaced relative to each other, so as to be able to adjust the angular orientation or positioning of the lamphead 12 with regard to the hollow-cylindrical post 14 and stub shaft, and thereby also adjusting the pivoted orientation of the lamphead 12 relative to an exit signs in which the lamphead is mounted.

As illustrated by the representation of FIG. 2, represented from the opposite side of the swivel unit 10 mounting the lamphead 12, in that position the lamphead 12 is shown in its fully extended orientation or, essentially, almost coaxially coextensive with the hollow-cylindrical post 14 and stub shaft 18 so as to form a basically linear lamphead-mounting structure.

Heretofore, upon effectuating a loosening of the screw 30 holding the two swivel halves 22, 24 together, it was possible to swivel the lamphead 12 practically over substantially 270° about the center or pivoting axis of the swivel unit 10. Upon occasion, this may conceivably cause the lamphead to cover or obscure, at least partially or even completely, the exit sign legend, whereas in accordance with the current Underwriters Laboratory (UL) interpretation of the newly promulgated 1998 NFPA code, the lamphead 12 should not be permitted to rotate or swivel downwardly to either fully or partially cover the exit legend of an exit sign.

Accordingly, pursuant to the invention rotation limiting structure is incorporated into the swivel unit 10 in order to prevent the lamphead from pivoting past a predetermined extended or angular position relative to the hollow-cylindrical post 14 and stub shaft 18, as shown in FIG. 2 of the drawings.

In order to accomplish the foregoing pursuant to a first embodiment of the invention as is illustrated in FIGS. 3 through 8 of the drawings, the outer cylindrical surface 34 of the one swivel half 22 mounting the lamphead 12 is provided with a radially outwardly extending tab or stop element 36, which may be of a rectangular cross-section, and which is located adjacent the edge of contact or sliding surfaces 28 between the mutually rotatable swivel halves 22, 24. The tab 36 is located on the swivel half 22 radially opposite or 180° offset from the location of the lamphead 12. The swivel half 24 mounting the post 14 and stub shaft 18 has the post 14 extending over the contact surfaces 28. Formed in the post 14 is a curvilinear groove 38 extending along the outer cylindrical surface portion 40 of the swivel unit half 24, and with the groove being of a height able to receive the tab 36 during rotation of the swivel unit 10.

Figure 3:
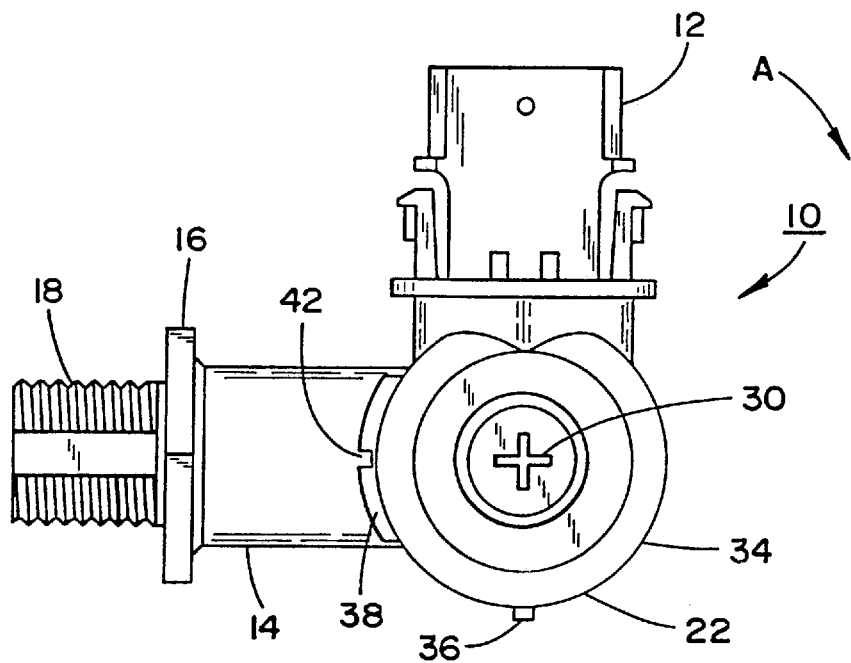
FIGS. 3 and 4 illustrate, respectively side and perspective views of the arrangement of FIG. 1 in the pivoted position of the lamphead, showing the rotation limiting arrangement pursuant to the invention.
Figure 4:
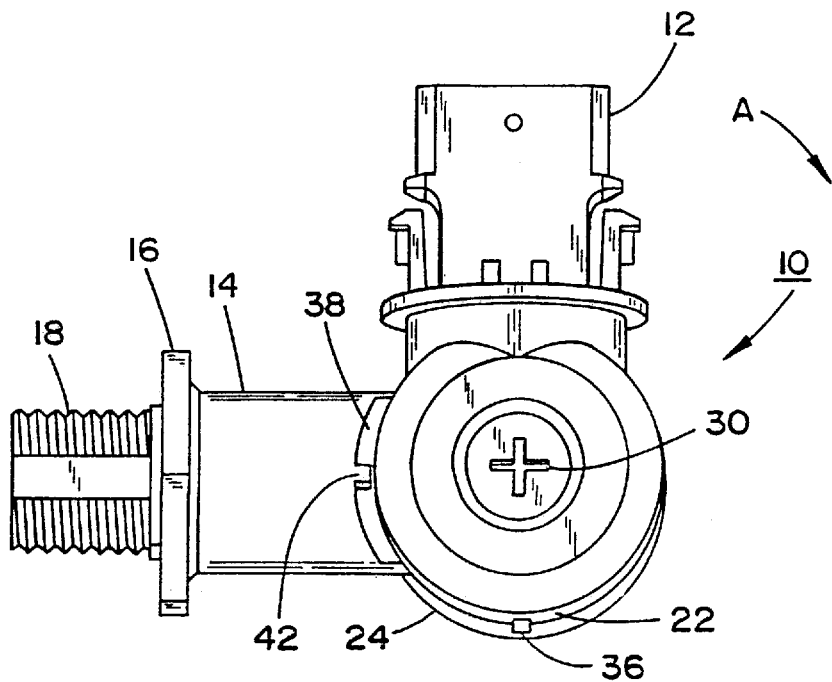

The groove 38 at its center or middle has an upstanding tab or stop element 42 formed therein which extends across the height of the groove, and is in coplanar alignment with the tab or stop element 36 which is formed on the outer surface of the swivel half 22. In essence, the tab 42 which extends across the height of the groove 38 in the hollow-cylindrical post 14 is an integral component of the swivel half 24 of the swivel unit 10. Consequently, upon rotation of the swivel half 22 mounting the lamphead, and resultingly the lamphead 12 which is fastened thereto, such as in the direction of the arrow A as shown in FIGS. 3 and 4, this causes the tab 36 on the outer circumferential surface of the swivel half 22 to slide into the groove 38 formed in the cylindrical post 14 which extends the other swivel half 24. This particular construction of the tab 36 on the swivel half 22 mounting the lamphead 12 is clearly illustrated in FIG. 6, whereas the tab 42 extending into the groove 38 of the post 14 and formed integrally therewith is shown in FIG. 5, with both tabs 36, 42 being in essentially coplanar alignment.

Figure 8:
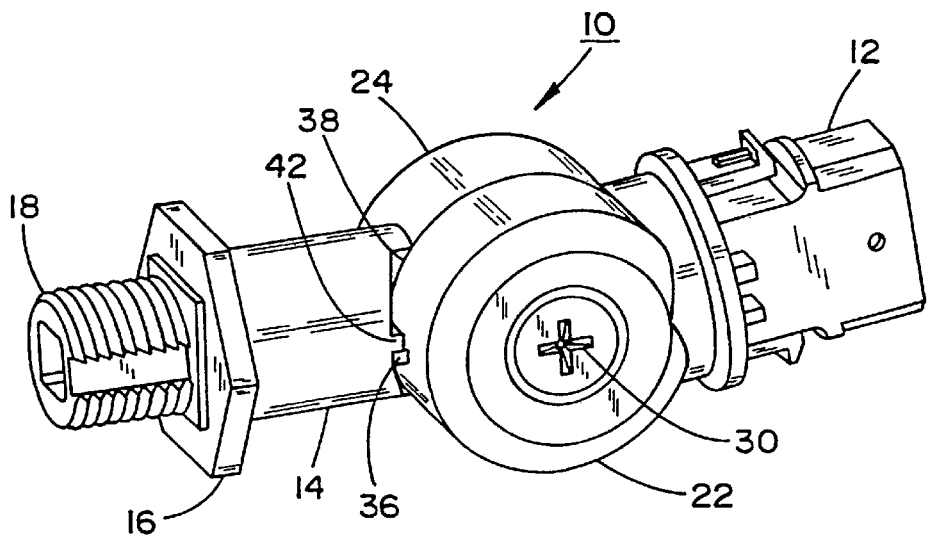
FIG. 8 illustrates a perspective side view of the tabs in cooperative contact inhibiting the further pivoting movement of the lamphead.

When the lamphead 12 is swivelled in the direction of arrow A, as indicated in FIGS. 3 and 4, the tab 36 on the outer surface of the swivel half 22 slides into the groove 38 formed in the hollow-cylindrical post 14, and upon reaching of the fully extended position of the lamphead, particularly as is shown in FIG. 7 and 8 of the drawings, the mutually facing surfaces of the tabs 36, 42 come into contact so as to form a stop, thereby preventing the lamphead 12 from rotating further past the extended position illustrated in FIGS. 7 and 8. This, in essence, will prevent the lamphead from obscuring or blocking the legend provided on an exit sign or the like.

In the event it is desired to provide an oppositely oriented or pivotable lamphead 12, it is merely necessary to loosen the screw 30 so as to permit the swivel halves to separate and rotated relative to each other, whereby the tab 36 on the outer circumferential surface of the swivel half 22 mounting the lamphead 12 is located on the opposite side of the tab 42 which is formed in the groove 38 of the post 14. This will enable the lamphead to pivot similarly as heretofore; however, in a so-called left-handed or "mirror image" orientation, i.e. oppositely directed.

Figure 9:
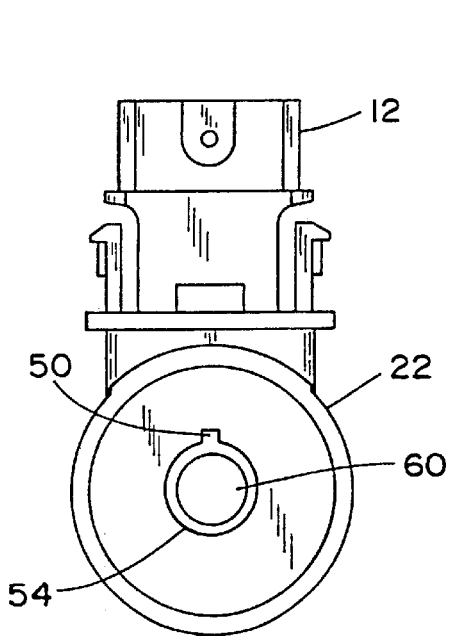
FIGS. 9 and 10 illustrate, respectively, mating swivel halves of another embodiment of the swivel unit mounting the lamphead, showing cooperating tab or stop elements which are formed on the radially inner swivel surfaces.
Figure 10:
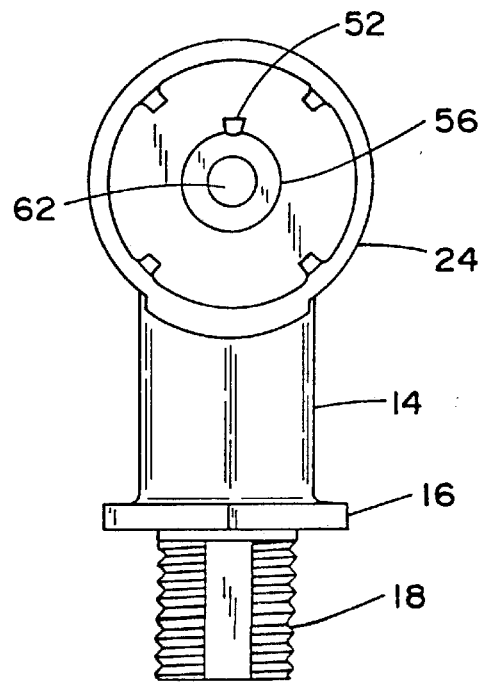

In a modified arrangement wherein the function of the swivel unit 10 is essentially analogous with that described hereinbefore, having to reference to FIGS. 9 and 10 of drawings, in which similar or identical components are identified with the same reference numerals as in the previous embodiment, cooperating tab or stop elements 50, 52 are formed on the interior circumferential surface portions 54, 56 of the respective swivel halves 22, 24, and during relative rotation between the swivel halves, are adapted to contact each other to prevent further rotation of the lamphead 12 relative to the hollow-cylindrical post 14 and stub shaft 18. In that instance, one of the tabs 50 is shown in FIG. 9 as being mounted in the interior hub portion 60 of the cylindrical swivel half 22 mounting the lamphead 12, whereas the cooperating tab 52 is mounted on the cylindrical portion 62 of the mating swivel half 24 with the post and stub shaft for mounting the entire swivel unit on a fixture, such as an exit sign or the like. For the remainder, the function of the interengagable contacting stop elements or tabs 50, 52 in the embodiment of FIGS. 9 and 10 is identical with the tabs 36, 42 of the embodiment of FIG. 3 through 8.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A rotation limiting arrangement for a lamphead swivel unit, said swivel unit including a first swivel half mounting a lamphead, a second swivel half having a post and stub shaft extending therefrom for attachment to a fixture, said first and second swivel half each comprising a cylindrical member having contacting end surfaces slidingly engaging each other during relative rotation between said swivel halves about a common axis of rotation, said first and second swivel halves being interconnected for relative rotation to enable said lamphead to swivel relative to said post and stub shaft; said rotation limiting arrangement comprising:

(a) tab means on said first swivel half forming a stop element said tab means extending radially outwardly of a cylindrical outer surface of said half proximate said contacting end surfaces; and (b) tab means on said second swivel half forming a stop element, said post extending radially outwardly from a cylindrical outer surface of said second swivel half and protruding across the contacting end surfaces between said swivel halves; groove means being formed in said post adjacent the cylindrical outer surface of said second swivel half, said tab means on said second swivel half being located within said groove means, whereby said tab means on said first and second swivel halves of said swivel unit are adapted to contact each other upon said lamphead being swivelled through a predetermined angle of rotation relative to said post and stub shaft and prevent further rotational advance of said lamphead.

2. A rotation limiting arrangement as claimed in claim 1, wherein said tab means on said first swivel half is located in axial alignment with said tab means on said second swivel half so as to be able to slide into said groove means and contact said tab means formed therein responsive to rotation of said first swivel half to thereby prevent further rotation of said lamphead.

3. A rotation limiting arrangement as claimed in claim 1, wherein said groove means comprises a curvilinear groove extending across said post along the outer surface of said second swivel half.

4. A rotation limiting arrangement as claimed in claim 1, wherein said tab means on said first swivel half extends about 180° opposite the direction of said lamphead on said first swivel half.

5. A rotation limiting arrangement as claimed in claim 1, wherein tab means on said first and second swivel halves are arranged on internal hub portions of said swivel halves and extend radially inwardly therefrom.

6. A rotation limiting arrangement as claimed in claim 1, wherein said tab means on said first and second swivel halves are integrally formed therewith.

* * * * *